US008341927B2

(12) United States Patent
Barnett (10) Patent No.: US 8,341,927 B2
(45) Date of Patent: *Jan. 1, 2013

(54) CROP HARVESTING HEADER WITH ROTARY DISKS AND IMPELLERS FOR TRANSFERRING THE CROP INWARDLY TO A DISCHARGE OPENING

(75) Inventor: Neil Gordon Barnett, Winnipeg (CA)

(73) Assignee: MacDon Industries Ltd, Winnipeg, MB (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,228

(22) Filed: Jul. 16, 2012

(65) Prior Publication Data

US 2012/0279189 A1    Nov. 8, 2012

Related U.S. Application Data

(60) Continuation of application No. 13/043,251, filed on Mar. 8, 2011, now Pat. No. 8,240,114, which is a division of application No. 12/177,929, filed on Jul. 23, 2008, now Pat. No. 8,006,469.

(60) Provisional application No. 60/971,961, filed on Sep. 13, 2007.

(51) Int. Cl.
*A01D 43/00*    (2006.01)
(52) U.S. Cl. ........................................... 56/157; 56/14.5
(58) Field of Classification Search ............... 56/6, 13.5, 56/13.6, 13.9, 14.3, 14.5, 16.4 A, 51, 53, 56/94, 157, 192, 255, 296

See application file for complete search history.

(56) References Cited

U.S. PATENT DOCUMENTS

| 2,906,077 | A | 9/1959 | Hale |
| 3,014,324 | A | 12/1961 | McCarty |
| 4,166,350 | A | 9/1979 | Werner |
| 4,244,163 | A | 1/1981 | Gantzer |
| 4,330,982 | A | 5/1982 | Vissers |
| 4,809,488 | A | 3/1989 | Neuerburg |
| 5,237,804 | A | 8/1993 | Bertling |
| 5,272,859 | A | 12/1993 | Pruitt |
| 5,345,752 | A | 9/1994 | Pruitt et al. |
| 5,430,997 | A | 7/1995 | O'Halloran et al. |
| 5,433,064 | A | 7/1995 | Schmitt |
| 5,463,852 | A | 11/1995 | O'Halloran |

(Continued)

FOREIGN PATENT DOCUMENTS

CA    2166671    4/1997

(Continued)

*Primary Examiner* — Thomas B Will
*Assistant Examiner* — Joan D Misa
(74) *Attorney, Agent, or Firm* — Adrian D. Battison; Ade & Company Inc (57) ABSTRACT

A crop header has generally horizontal flail disks mounted for driven rotation about generally upright axes. A pair of conditioner rolls is mounted in a discharge opening and a transfer roller is mounted behind the disks and in front of the nip. At each end, two disks are mounted outwardly of the discharge opening each rotating so that its blade moves inwardly and each carries an impeller to carry the crop inwardly. A third disk is arranged so that a line forward of the end of the discharge opening intersects the third disk inward of the axis of the third disk. The third disk rotates so that its blade moves outwardly so that the crop tends to pass between the second and third disks. A pair of impellers are mounted behind the second disk and move inwardly to carry the cut crop to the discharge opening.

3 Claims, 5 Drawing Sheets

U.S. PATENT DOCUMENTS

| | | |
|---|---|---|
| 5,722,225 A | 3/1998 | Wuebbels et al. |
| 5,749,208 A | 5/1998 | Wuebbels et al. |
| 5,768,865 A | 6/1998 | Rosenbalm |
| 5,852,921 A | 12/1998 | Neuerburg |
| 5,852,922 A | 12/1998 | Over Behrens et al. |
| 6,047,532 A | 4/2000 | O'Halloran et al. |
| 6,073,429 A | 6/2000 | Wuebbels et al. |
| 6,581,362 B2 | 6/2003 | Rosenbalm |
| 6,658,832 B2 | 12/2003 | Wubbels et al. |
| 6,718,743 B2 | 4/2004 | Rosenbalm |
| 7,165,381 B2 | 1/2007 | Rosenbalm et al. |
| 2003/0159420 A1 | 8/2003 | Wubbels |
| 2005/0126142 A1 | 6/2005 | Rosenbalm et al. |
| 2008/0016837 A1 | 1/2008 | Rosenbalm et al. |
| 2008/0066439 A1 | 3/2008 | Barnett |
| 2008/0066440 A1 | 3/2008 | Barnett |
| 2008/0066441 A1 | 3/2008 | Barnett |

FOREIGN PATENT DOCUMENTS

| | | |
|---|---|---|
| CA | 2559217 | 9/2006 |
| CA | 2559353 | 9/2006 |
| CA | 2578907 | 2/2007 |
| DE | 3224170 | 12/1983 |
| DE | 3501133 | 7/1986 |
| EP | 0524668 | 1/1993 |
| EP | 358045 | 11/1993 |

CROP HARVESTING HEADER WITH ROTARY DISKS AND IMPELLERS FOR TRANSFERRING THE CROP INWARDLY TO A DISCHARGE OPENING

This application is a continuation of application Ser. No. 13/043,251 filed Mar. 8, 2011 which is a continuation of application Ser. No. 12/177,929 filed Jul. 23, 2008 now issued as U.S. Pat. No. 8,006,469.

This application claims the benefit under 35 U.S.C. 119 of Provisional Application 60/971,961 filed Sep. 13, 2007.

This invention relates to a crop harvesting header which has a cutter bar across the width of the header which carries and drives a plurality of transversely spaced rotary disks and particularly to an improved impeller for transferring the cut crop inwardly from outer disks to a discharge opening.

This application relates to the subject matter disclosed in the following documents:

U.S. Published Application 2008/0066440 filed Sep. 15, 2006 and published Mar. 23, 2008 which corresponds to Canadian application 2,559,353 and entitled CROP HARVESTING HEADER WITH ROTARY DISKS AND IMPELLERS FOR TRANSFERRING THE CROP INWARDLY TO A DISCHARGE OPENING;

U.S. Published Application 2008/0066441 filed Sep. 15, 2006 and published Mar. 23, 2008 which corresponds to Canadian application 2,559,217 and entitled CROP HARVESTING HEADER WITH ROTARY DISKS AND A TRANSFER ROLLER CARRYING THE CUT CROP TO THE NIP OF A PAIR OF CONDITIONING ROLLS;

U.S. Published Application 2008/0066439 filed Feb. 15, 2007 and published Mar. 23, 2008 which corresponds to Canadian application 2,578,907 and entitled CROP HARVESTING HEADER WITH ROTARY DISKS AND IMPELLERS FOR TRANSFERRING THE CROP INWARDLY TO A DISCHARGE OPENING.

The disclosures of the above published applications are incorporated herein by reference or the disclosures may be referred to by the reader for further detail of the subject matter disclosed herein.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

Examples of such rotary type cutters are shown in the following documents.

U.S. Pat. No. 5,272,859 (Pruitt) issued Dec. 28, 1993 discloses a mower/conditioner including a cutter bar and rotating disks feeding to a rear discharge opening containing a pair of conditioning rollers. The outermost disk carries a generally cylindrical impeller in the form of an upright cylindrical cage. In front of the discharge opening is a series of disks arranged in counter-rotating pairs.

U.S. Pat. No. 5,463,852 (O'Halloran) issued Nov. 7, 1995 and U.S. Pat. No. 5,433,064 issued Jul. 18, 1995 (Schmitt) assigned to Hay and Forage Industries of Hesston both show a construction of such a rotary cutter system in which there is a series of the cutter disks at spaced positions across the cutter bar with, at each end, two of the cutter disks extend beyond a central area in front of a discharge opening. In this arrangement the two end disks are driven by a mechanical drive system. The two end disks each carry a rotary transfer element in the form of a series of posts arranged at the periphery of a cylinder surrounding a vertical axis standing upwardly from the disk. The transfer elements act to carry the crop material which is cut by the disks inwardly toward the discharge opening. A conventional crop conditioner in the form of a pair of counter-rotating rollers is mounted across the crop discharge opening.

U.S. Pat. No. 6,158,201 (Pruitt) issued Dec. 12, 2000 also assigned to Hay and Forage Industries discloses a modification to the above 852 and 064 patents of HFI where a crop transport roller is added in the crop discharge opening and is arranged to carry crop up to the nip of the conditioner rollers.

U.S. Pat. No. 6,581,362 issued Jun. 24, 2003 and U.S. Pat. No. 6,718,743 issued Apr. 13, 2004 (Rosenbalm) assigned to Deere and Company both disclose a rotary cutter system which has two end disks outboard of the central discharge opening with a conditioner arranged at the discharge opening for receiving the cut crop and providing a conditioning action. Over the end cutters is arranged an impeller system.

U.S. Pat. No. 5,768,865 (Rosenbalm) issued Jun. 23, 1998 assigned to Deere and Company discloses a rotary cutter system which has two end disks outboard of the central discharge opening with a conditioner arranged at the discharge opening for receiving the cut crop and providing a conditioning action. The conditioner can be either of a flail type or of a fluted roller type.

U.S. Pat. No. 5,852,921 (Neuerberg) issued Dec. 29, 1998 to Kuhn discloses impellers behind a row of cutting disks.

U.S. Pat. No. 4,809,488 (Neuerburg) issued Mar. 7, 1989 assigned to Kuhn discloses a rotary cutter system which has a frusto-conical cage as the impeller on an end disk where a drive shaft extends into the top of the cage.

EP 358,045 (Ungruh) assigned to Niemeyer Sohne GmbH published Nov. 3, 1993 discloses a mower which has at least four cutting disks arranged in two pairs rotating in the same direction and feeding to the center. Above each disk carries a cylindrical impeller which has a surface running inwardly to carry the crop towards the centre. In the region between each of the disks of each pair is a further cylindrical impeller which assists in transporting the crops to the centre.

German 32 24 170 (Mortl) published Dec. 29, 1983 discloses a header having a discharge opening behind the outermost cutters of a group which includes four cutters. The group is arranged in two pairs with each pair rotating in opposite directions. Thus the outer cutter of the group rotates inwardly. Outboard of this cutter is provided a further cutter which also rotates inwardly as shown by the arrows. This reference also includes a pair of impellers, each mounted on a respective one of the two outer cutters which act as a conveying device for carrying the crop inwardly. The impeller is generally an upwardly tapered element of triangular cross section.

EP 0 016 661 (Maier) published Nov. 12, 1986 and assigned to Deutz Fahr discloses a cutter bar formed by a series of cutting disks where the end two disks at one end each carry a respective cylindrical impeller for carrying the cut crop to a discharge opening where there is located a conditioner.

German 35 01 133 (Schulze-Selting) published Jul. 17, 1986 also assigned to Deutz Fahr discloses a cutter bar formed by a series of cutting disks where the end disk at one end carries a respective cylindrical impeller for carrying the cut crop to an opening and there is provided an intermediate suspended impeller over the next disk where the suspended impeller is frusta-conical.

U.S. Pat. No. 4,330,982 (Vissers) issued May 25, 1982 and assigned to Multinorm discloses a series of rotary cutters with a pair of conditioning rollers which extend transversely or laterally across the mower narrower than the cutting zone and located in a discharge opening. A roller defines a portion or surface that moves upwardly and rearwardly from the cutting plane to the nip to convey the crop cut by the cutting disks toward the nip. The cutters are arranged in three pairs with each pair rotating in opposite direction so as to tend to feed the material between the pair. Behind the pairs is located an auger type converging system which carries the cut crop over the auger tube while tending to move the crop material inwardly to the discharge opening.

U.S. Pat. No. 4,224,163 (Gantzer) issued Jan. 13, 1981 and assigned to Kuhn discloses a series of rotary cutters arranged in pairs with each pair rotating in opposite direction so as to tend to feed the material between the pair. On top of the end pair is located a vertical belt type converging system with an end roller coaxial with the end cutter and a second vertical roller spaced inwardly and rearwardly from the end roller so that the belt carries the cut crop inwardly to the discharge opening.

EP 0,524,668 (van der Lely) published Jan. 27, 1993 and assigned to Van Der Lely discloses a series of rotary cutters arranged in pairs with each pair rotating in opposite direction so as to tend to feed the material between the pair. Behind the end pair is located a rotary crop displacing member which carries the cut crop inwardly to the discharge opening. This is formed by a plurality of tines which extend radially from a horizontal shaft mounted along the line of travel and above the cutters. The end disk also carries a drum type impeller.

U.S. Pat. No. 2,906,077 (Hale) issued Sep. 29, 1959 discloses conditioner rollers in front of which is mounted a rotating roller which rotates to feed crop upwardly and rearwardly into the nip. Forwardly of the roller is located a sickle blade type cutter.

U.S. Pat. No. 3,014,324 (McCarty) issued Dec. 26, 1961 discloses a pair of conditioner rollers feeding into a nip therebetween. A roller is located in front of and below the nip of the conditioner roller and rotates in a direction to feed crop into the nip.

Canadian 2,166,671 (Savoie) published Apr. 6, 1997 discloses a disc cutter and a conveyor roller which feeds into the nip between a pair of conditioning rolls located in a discharge opening behind and narrower than the cutter.

From the above prior art patents, it will be noted that it is well known and widely used that each of two outermost disks carries a respective impeller body carried on the disk and driven by the disk about a common generally upright axis. These impeller bodies or members act to carry the crop as it is cut inwardly toward the discharge opening so that the crop can better enter the discharge opening with less chance of blocking or collecting in the area in front of the disks or within the discharge opening.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

Where a crop conditioner is used, a transfer roller is commonly used to lift the crop from the cutting zone to the nip of the conditioner rollers.

The different types of impellers used commonly at the outer cutting disks include drums which are of closed outer wall and cages which are formed of bars at angularly spaced positions around the axis. In most cases the impellers are cylindrical so that the cross section of the impeller is constant along the height of the impeller. In other cases the impeller is tapered so that its diameter decreases as the height increases so that it is either frusto-conical if circular in cross-section or frusto-pyramidical if of square or triangular cross section.

In many cases the impellers are carried on and driven by the disks but in addition intermediate impellers, which are located at a position which is not aligned with one of the disks, can be supported and driven from above as a suspended or hanging impeller. These hanging impellers have the same shapes and construction, that is cylindrical or tapered, as the standing impellers at the disks.

U.S. published patent application 2005/0126142 (Rosenbalm) now U.S. Pat. No. 7,165,381 assigned to Deere discloses three cage type impellers arranged across the outermost three disks where the bottom disk of the impeller is formed as a frusto-conical member converging upwardly and inwardly to the cage bars.

The 995 disk mower of Deere as disclosed in U.S. published patent application 200810016837 (Rosenbalm) has a converging system of the type shown in the above patent of Rosenbalm which acts to carry the crop to the discharge opening where the conditioner when provided is located. When the conditioner is omitted, a vertical converging roller is mounted immediately inward of the outer edge of discharge opening with a textured outer surface to transport the crop material inwardly of the width of the discharge opening. A second roller is also provided which has its axis inclined upwardly inwardly across the top of the swath so as to attempt to act to compress the side edges of the swath downwardly and inwardly for improved consolidation. This arrangement is designed for an 8 or 10 disk machine but is ineffective at providing a properly consolidated swath of a required width.

SUMMARY OF THE INVENTION

It is one object of the invention to provide a crop harvesting header of the type having a series of rotary cutting disks on a cutter bar and particularly to provide an improved impeller arrangement for assisting in transferring crop inwardly from one or more outer disks toward the discharge opening.

According to a first aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

in front of the discharge opening there being located a plurality of the cutter disks arranged in a plurality of pairs of disks with each pair arranged to rotate in opposite directions;

the plurality of the cutter disks in front of the discharge opening including a first end disk located such that an imaginary line extending forwardly from a first end of the discharge opening intersects the first end disk, and a second end disk located such that an imaginary line forwardly from a second end of the discharge opening intersects the second end disk;

the first end disk and the second end disk being arranged to rotate in respective directions so that a front of each of the first and second cutter disks moves outwardly of the respective end of the discharge opening;

a first one of the plurality of disks, which is mounted outwardly of the first end of the discharge opening, forming a first pair with the first end disk so as to rotate in a direction opposite thereto such that at least some of the crop tends to be swept into a first zone between the first pair of disks and to pass through that zone;

a second one of the plurality of disks, which is mounted outwardly of the second end of the discharge opening, forming a second pair with the second end disk so as to rotate in a direction opposite thereto such that at least some of the crop tends to be swept into a second zone between the second pair of disks and to pass through that zone;

a crop converging structure located behind the first zone and tending to move the crop inwardly toward the discharge opening;

a crop converging structure located behind the second zone and tending to move the crop inwardly toward the discharge opening;

wherein the crop converging structures each comprise at least one impeller having an outer periphery rotatable about a generally upstanding axis.

Preferably there is provided in the discharge opening a pair of conditioning rollers forming a nip through which the crop passes and a transfer roller carrying the crop to the nip and wherein said at least one impeller is located outwardly of and adjacent an end of the transfer roller.

Preferably there is provided in the discharge opening a pair of conditioning rollers forming a nip through which the crop passes and a transfer roller carrying the crop to the nip and wherein the inner impeller is located outwardly or an adjacent an end of the transfer roller.

Preferably the transfer roller has an end mounting housing and the inner roller is mounted outwardly of the housing with a front periphery of the inner roller projecting forwardly of a vertical plane transverse to the header and containing a front face of the housing.

Preferably said at least one impeller is located such that an outer surface of said at least one impeller does not intersect an imaginary circle defined a cutting path of movement of the pair of cutting disks.

Preferably said at least one impeller has a height such that a bottom end thereof is below a cutting plane defined by the cutting disks.

Preferably the crop converging structures each comprise two impellers generally side by side.

Preferably an inner one of the impellers is inward and rearward of an outer one of the impellers.

Preferably behind the impellers is provided a generally upstanding rear wall which is inclined rearwardly and inwardly.

Preferably the impeller has a generally cylindrical peripheral surface.

Preferably there is provided in the discharge opening a pair of conditioning rollers forming a nip through which the crop passes and a transfer roller carrying the crop to the nip.

Preferably there is provided in the discharge opening a pair of conditioning rollers forming a nip through which the crop passes and a transfer roller carrying the crop to the nip and wherein the inner impeller is located along side an end of the transfer roller in the discharge opening.

Preferably there is provided a first extra cutter disk outside the first one of the disks and second extra cutter disk outside the second one of the disks, each turning inwardly toward the discharge opening.

Preferably each of the first and second extra cutter disks carries an impellers thereon.

Preferably there is provided a series of three impellers in a row at the disks.

Preferably there are 12 cutter disks.

Preferably the first and the second end disks are arranged with their axis of rotation outward of the discharge opening.

According to a second aspect of the invention disclosed herein, there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

in front of the discharge opening there being located a plurality of the cutter disks arranged in a plurality of pairs of disks with each pair arranged to rotate in opposite directions;

the plurality of the cutter disks in front of the discharge opening including a first end disk located such that an imaginary line extending forwardly from a first end of the discharge opening intersects the first end disk and a second end disk located such that an imaginary line forwardly from a second end of the discharge opening intersects the second end disk;

the first end disk and the second end disk being arranged to rotate in respective directions so that a front of each of the first and second cutter disks moves outwardly of the respective end of the discharge opening;

a first one of the plurality of disks, which is mounted outwardly of the first end of the discharge opening, forming a first pair with the first end disk so as to rotate in a direction opposite thereto such that at least some of the crop tends to be swept into a first zone between the first pair of disks and to pass through that zone;

a second one of the plurality of disks, which is mounted outwardly of the second end of the discharge opening, forming a second pair with the second end disk so as to rotate in a direction opposite thereto such that at least some of the crop tends to be swept into a second zone between the second pair of disks and to pass through that zone;

a crop converging structure located behind the first zone and tending to move the crop inwardly toward the discharge opening;

a crop converging structure located behind the second zone and tending to move the crop inwardly toward the discharge opening;

wherein there is provided a first extra cutter disk outside the first one of the disks and second extra cutter disk outside the second one of the disks, each turning inwardly toward the discharge opening.

According to a third aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening through which the cut crop is discharged for forming a swath behind the header;

in front of the discharge opening there being located a plurality of the cutter disks arranged in a plurality of pairs of disks with each pair arranged to rotate in opposite directions;

the plurality of the cutter disks in front of the discharge opening including a first end disk located such that a first imaginary line extending forwardly from a first end of the discharge opening intersects the first end disk and a second end disk located such that a second imaginary line forwardly from a second end of the discharge opening intersects the second end disk;

the first end disk and the second end disk being arranged to rotate in respective directions so that a front of each of the first and second cutter disks moves outwardly of the respective end of the discharge opening;

a first one of the plurality of disks, which is mounted outwardly of the first end of the discharge opening, forming a first pair with the first end disk so as to rotate in a direction opposite thereto such that at least some of the crop tends to be swept into a first zone between the first pair of disks and to pass through that zone;

a second one of the plurality of disks, which is mounted outwardly of the second end of the discharge opening, forming a second pair with the second end disk so as to rotate in a direction opposite thereto such that at least some of the crop tends to be swept into a second zone between the second pair of disks and to pass through that zone;

a crop converging structure located behind the first zone and tending to move the crop inwardly toward the discharge opening;

a crop converging structure located behind the second zone and tending to move the crop inwardly toward the discharge opening;

wherein the first end disk is arranged with its axis of rotation outward of the first imaginary line and the second end disk is arranged with its axis of rotation outward of the second imaginary line.

BRIEF DESCRIPTION OF THE DRAWINGS

In the drawings like characters of reference indicate corresponding parts in the different figures.

DETAILED DESCRIPTION

Figure 1:
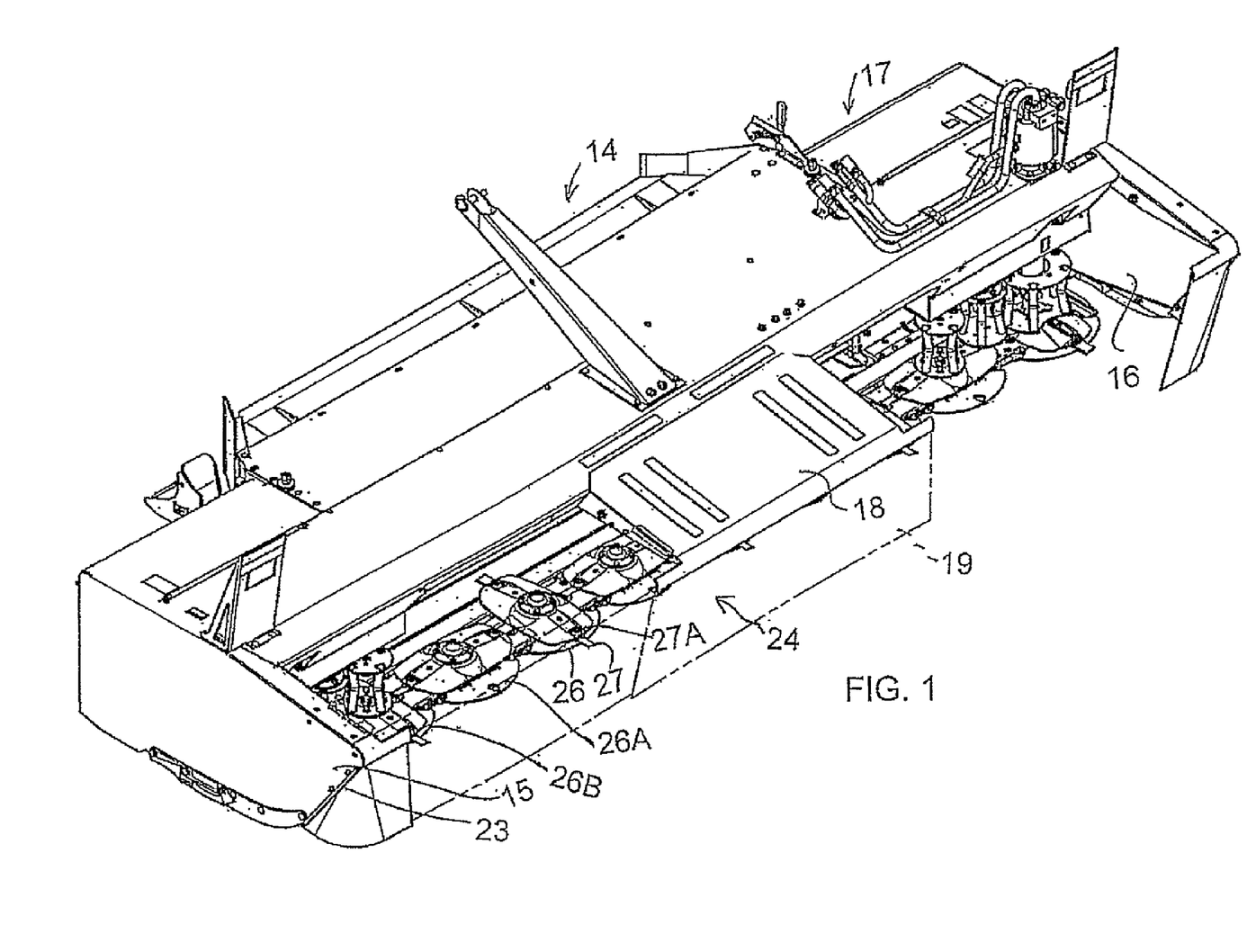
FIG. 1 is an isometric view of a header according to the present invention showing in general the construction concerned.

In FIG. 1 is shown schematically a header for attachment to conventional swather tractor of the well known type having driven ground wheels and rear castor wheels. A front support assembly of the tractor carries the header 14 including left and right lift arms which carry the header in a floating action across the ground along skid plates (not shown) of the header. The header includes side walls 15 and 16 forming part of a frame 17 attached to the conventional transport system of the tractor. The frame carries top covers 18 which support a front skirt 19 in front of the cutter bar.

The frame 17 includes a main transverse beam which is attached to the tractor. The main beam carries the side walls 15 and 16. The side walls each comprises a vertical wall extending forwardly to a front edge 23 in front of the cutter bar 24. The side wall is vertical and the front edge 23 lies in a vertical plane of the side wall so as to confine crop material to the interior of the header between the side walls for cutting action effected by the cutter bar 24.

Within the cutter bar 24 is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape so that a length between two ends 26A and 26B is significantly greater than a distance between the side edges in a direction at right angles to the length. At each of the ends 26A and 26B is mounted a respective one of a pair of flails 27 each for pivotal movement about a flail mounting pin 27A. The mounting pins are arranged at the ends and thus at the maximum extent of the disk so that the flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

Figure 2:
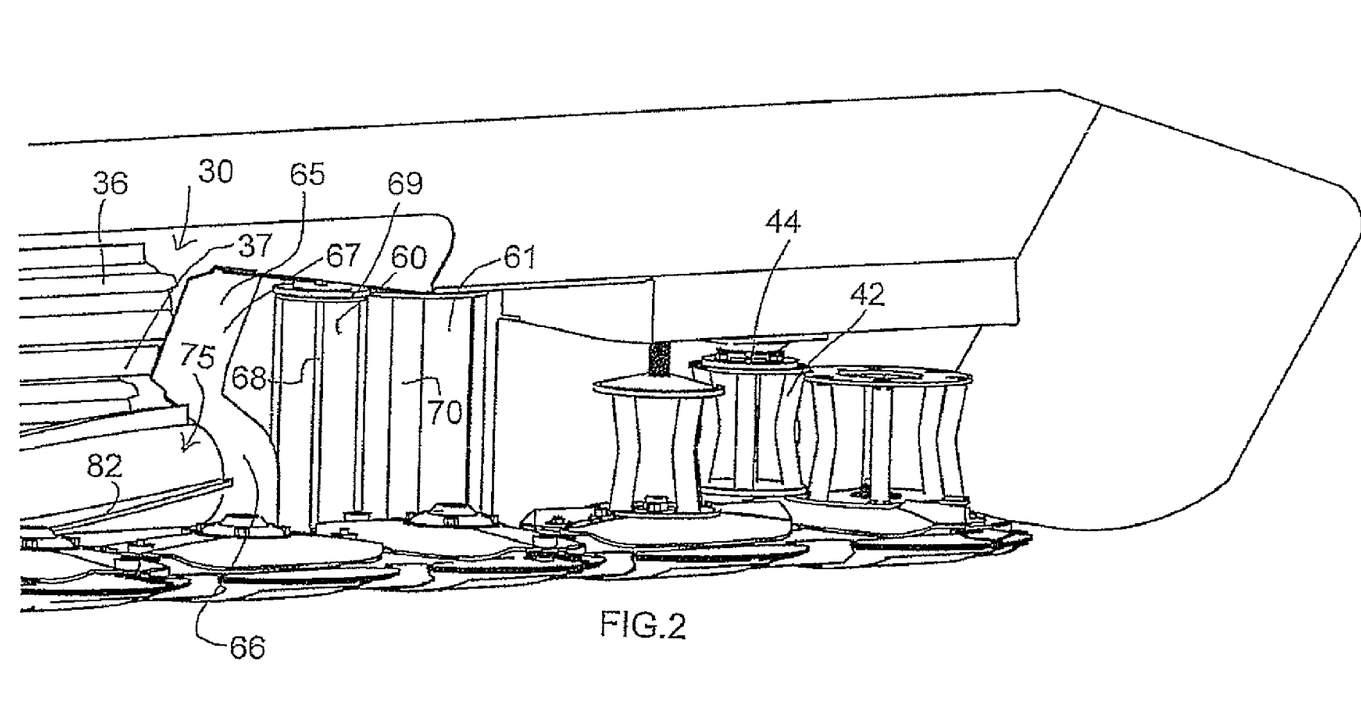
FIG. 2 is an isometric view of a one end of the header of FIG. 1 showing the components of the header with which the present invention is concerned.
Figure 3:
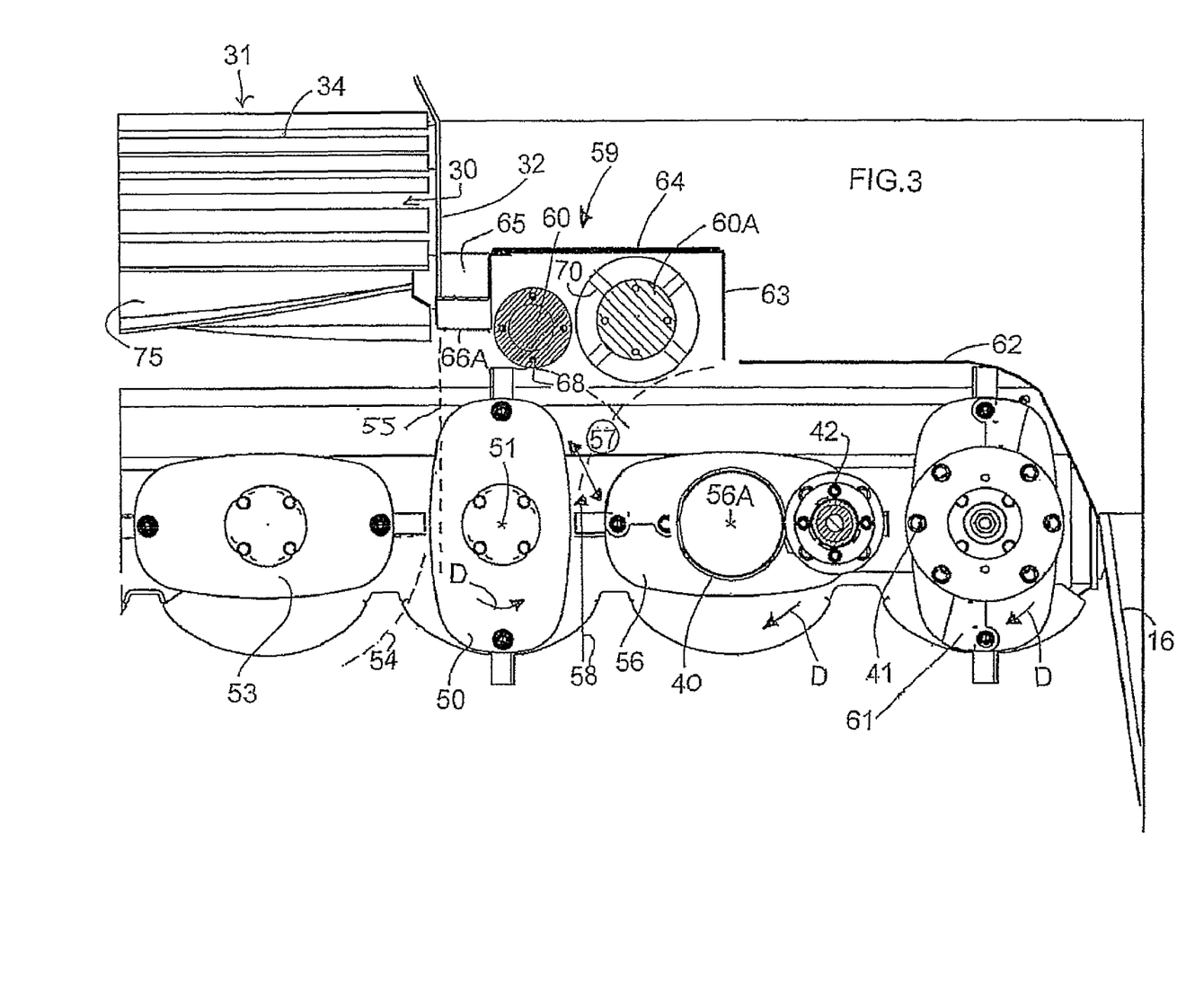
FIG. 3 is a top plan view of the end of the header of FIG. 2 showing the components of the header with which the present invention is concerned.
Figure 4:
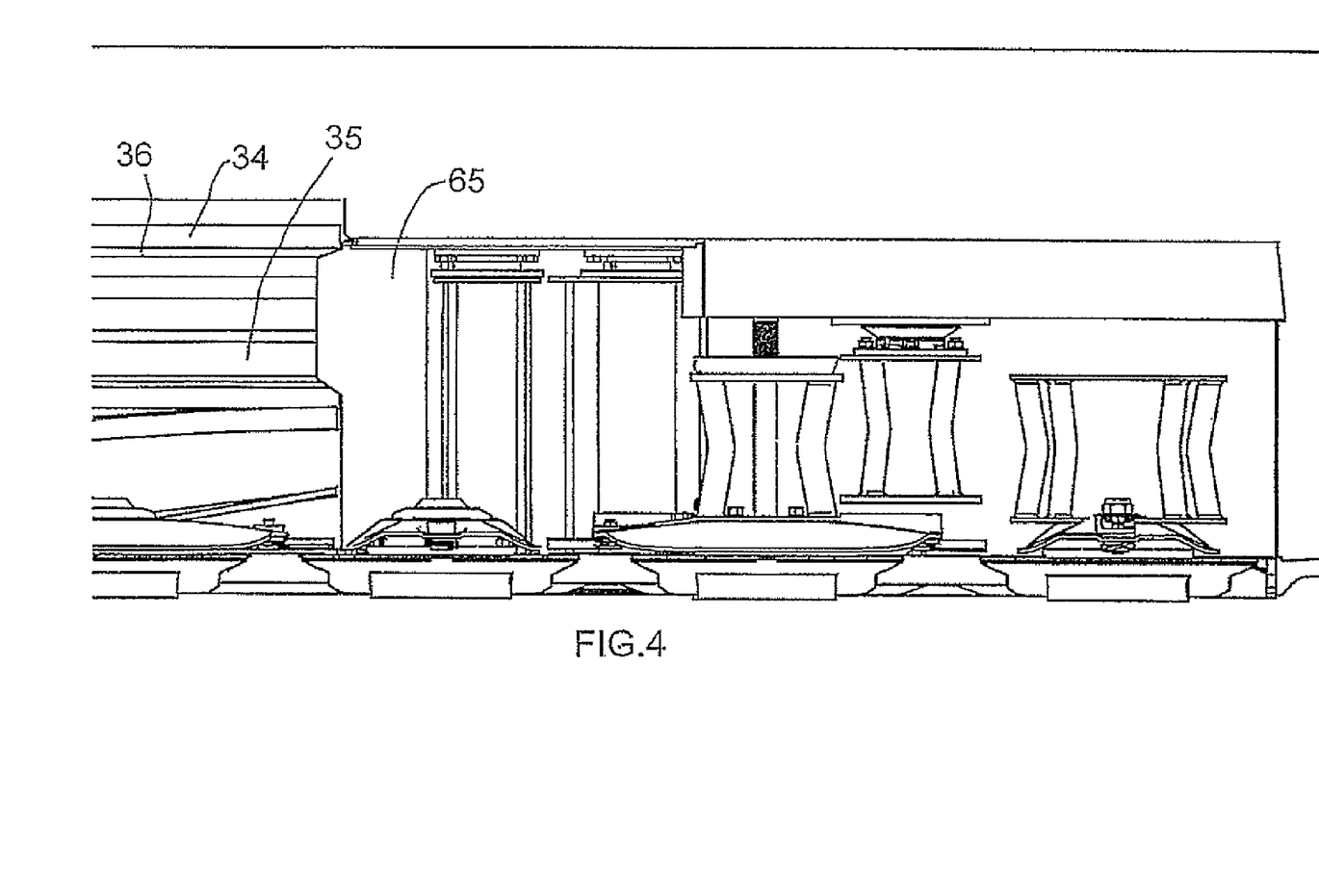
FIG. 4 is a front elevational view of the end of the header of FIG. 2 showing the components of the header with which the present invention is concerned.

As shown in FIGS. 2, 3 and 4, the cutter bar 24 is wider than a discharge opening 30 with a conditioning system 31 mounted in the discharge opening 30. Thus the crop material passes over and between the disks when cut and also must be converged from the full cut width into the discharge opening 30.

The cutter bar of this general construction is of a conventional nature and many examples of a commercial arrangement of this type are available in the market place. Thus the details of the cutter bar and its mounting are well known to one skilled in the art and further details can be obtained from such commercial devices.

In FIGS. 2, 3 and 4 only one end of the header is shown but it will be appreciated that the opposite end is identical and symmetrical to the end shown.

The discharge opening 30 has two side walls 32 which confine the crop material to pass through the discharge opening over a width less than the width of the header so that the side walls 32 are spaced inwardly from the respective end walls 15 and 16 of the header. A crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement so that the crop material passing through the discharge opening passes through a nip 37 between the conditioning rolls and is discharged from the rear of the conditioning system as a swath of material to be discharged onto the ground or to be collected as required.

The disks 26 mounted on the cutter bar 24 include a series of disks which are located in front of the discharge opening 30. Outward of these disks and either side is provided a pair of outer disks indicated at 56 and 61 with the disk 61 outermost. These disks are arranged to rotate inwardly so that the front extremity and the blade carried thereby rotates in the direction indicated at the arrows D as shown in FIG. 1 to carry the crop material which is cut by those disks inwardly toward the discharge opening.

Each of the disks 56 and 61 carries a respective one of a plurality of impellers. Thus the disk 56 carries an impeller 40 and the disk 61 carries an impeller 41. In between these two impellers is mounted a third impeller 42.

Thus in the embodiment shown there are three impellers arranged to engage the crop material during or slightly after the cutting action so as to carry the crop material inwardly toward the end wall of the discharge opening. The number of impellers can be increased or decreased depending upon particular requirements or particular designs. Thus there may be only two impellers or there maybe more impellers. The impellers 40 and 41 are mounted on the respective disk so as to be carried thereby and driven thereby. The impeller 42 is carried on the frame 17 at a position above the cutter bar 24 so as to be a hanging impeller supported from a mounting system 44 above the impeller wherein there is provided a suitable bearing and also a suitable drive system within a frame member of the frame 17.

While the impellers 40 and 41 are mounted on the respective disks to be driven thereby, in an alternative arrangement, the impellers may be hanging impellers in the style of arrangement shown at impeller 42.

The impellers 40 and 41 are directly co-axial with the respective disk, 56 and 61. Hanging impellers to replace these impellers may be also co-axially arranged with the corresponding disk or the axes of the impellers may be offset from the axes of the disks. It will be appreciated that the disks and the impellers co-operate to assist in carrying the crop material inwardly toward the discharge opening and to resist the crop material from moving rearwardly over the disks 56 and 61 to a rear bulkhead panel which could cause collection of the crop material and eventual blockage of the system.

The arrangement and construction of the impellers is described in detail in the above U.S. Published Application 2008/0066439 and Canadian application 2,578,907, to which reference may be made for those details.

The top conditioning roller 34 is located above the bottom conditioning roller 35. These define between them the nip 37 through which the crop material is controlled to pass. In order to assist the crop material from the cutting disks to flow to the nip 37, there is provided a crop transfer roller 75 which is located in the area between the rear of the disks and the nip of the conditioning roller system.

The top conditioning roll 34 and the bottom conditioning roll 35 are parallel and arranged such that the crop passes through the nip 37 between the top and bottom conditioning rolls. The top and bottom conditioning rolls are arranged such that the nip 37 is raised above the common cutting plane and is located behind the disks 26. The transfer roller 75 is mounted behind the disks and in front of the nip for transferring the crop upwardly and rearwardly from the disks to the nip. The top and bottom conditioning rolls 34, 35 each comprising a cylindrical body 77, mounted for rotation about an axis 78, 79 thereof. In one example, on the cylindrical body 77 is mounted a series of longitudinally extending, angularly spaced flutes 36 arranged such that the flutes 36 of the top roll 34 mesh with the flutes of the bottom roll 35 in the conditioning action, as is well known.

However the present invention is also applicable to conditioning rolls of the type which have no flutes or ribs so that the conditioning action is effected by a high crushing force between two plane rollers. The rollers can be smooth or may include grooves or indentations which are not intended to mesh in the crushing action. Crushing conditioner rolls of this type are well known to persons skilled in this art and different designs may be selected and used as will be known to such persons.

In addition the present invention can be used in an arrangement in which the conditioning roller and transfer roller are omitted.

The transfer roller 75 also comprises a cylindrical body 80 having a cylindrical outer surface mounted for rotation about its longitudinal axis. On the body 80 is mounted a series of longitudinally extending, angularly spaced ribs 82.

The arrangement and construction of the conditioning rollers and the transfer roller is described in detail in the above U.S. Published Application 200810066441 and Canadian application 2,559,217, to which reference may be made for those details.

Figure 5:
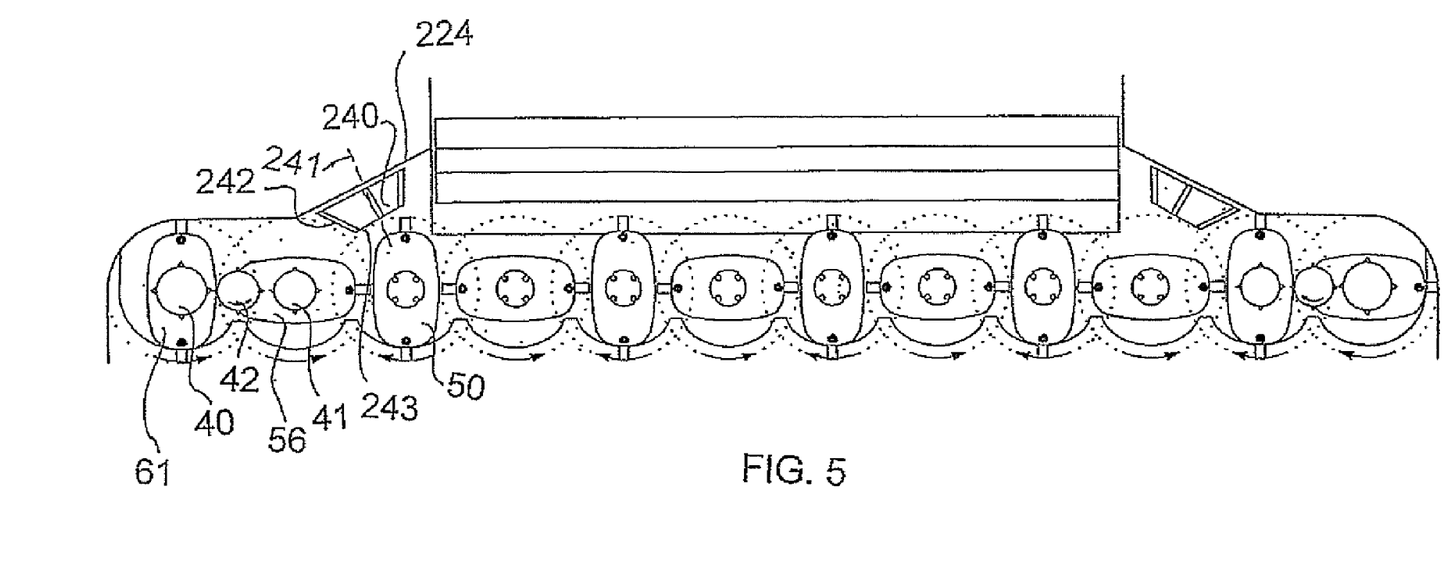
FIG. 5 is a top plan view of an alternative embodiment of header 2 showing the components of the header with which the present invention is concerned.

In a ten or twelve disk mower shown in FIG. 5, in front of the discharge opening there are located eight of the cutter disks arranged in four pairs of disks with each pair arranged to rotate in opposite directions such that the crop tends to pass between the pair of disks. The pairs of the cutter disks in front of the discharge opening include a first end disk 50 located in line with the first end 32 of the discharge opening and a second end disk (at the opposite end not illustrated) located in line with the second end of the discharge opening. That is an imaginary line 55 extending forwardly from the end 32 intersects the disk 50 at a position thereon spaced inwardly from its axis 51. The axis 51 and main body of the end disks 50 are mounted outboard of the line 55 of the opening so that the next adjacent disks 53 define a cutting circle 54 which is closely adjacent or at the line 55. Thus the majority of the end disks are outboard of the line 55.

The end disk 50 is arranged to rotate so that a front of the first disk moves outwardly of the respective end of the discharge opening as marked at direction arrow D. A first outer disk 56, which is mounted outwardly of the end line 55 of the discharge opening and outwardly of the end disk 50, forms a pair with the end disks 50 so as to rotate in a direction D opposite thereto such that at least some of the crop tends to be swept into a first zone 57 between the first pair of disks and to pass through that zone as shown schematically at arrow 58.

A crop converging structure 59 is located behind the zone 57 and tends to move the crop inwardly toward the discharge opening 30. The crop converging structure comprises at least one and preferably two impellers 60 and 60A each having an outer periphery rotatable about an upstanding axis and arranged generally side by side with an inner one 60 of the impellers inward and rearward of an outer one 60A of the impellers. Each impeller has a generally cylindrical peripheral surface.

In the arrangement shown in the figures there is a second outer disk 61 outboard of the disk 56. However in some cases the extra outer disk 61 can be omitted and the same construction can be used with the disks 50 and 56 rotating in the directions as shown so that the crop passes through to the crop converging system 59.

It will be noted that the two outer disks 56 and 61 both rotate in the direction of the arrow D so as to turn inwardly toward the discharge opening. This causes additional crop to be passed into the zone 57 along the direction 58 between the disks 50 and 56.

As previously described the crop at the two outer disks 50 and 56 is converged using the three impeller system defined by the impellers 40, 41 and 42.

Behind the disks 56 and 61 is provided an upstanding rear wall 62 which forms part of the end wall defined by the end 16 of the header so that the end wall converges rearwardly and inwardly into the rear wall 62 behind the outermost disk 61. The rear wall 62 extends inwardly behind the disk 56 extending along the line generally transverse to the header. Behind the axis 56A of the disk 56, the rear wall 62 includes a rear turned portion 63 which extends at right angles to the rear wall portion 62 to a further rear wall portion 64 parallel to the rear wall portion 62 and recessed therefrom.

The transfer roller 75 is carried in bearings (not visible) mounted in a housing 65. The housing 65 is shaped as best shown in FIG. 2 with a lower portion 66 engaged around the bearing of the roller 75 so that an upper part of the portion 66 extends rearwardly and a further portion 67 which extends upwardly toward a top of the header. Thus the housing is recessed as much as possible around the roller 75 so as to expose as much of the inside surface of the inner impeller 60 on the inside surface of that impeller.

The recess section of the rear wall is provided to receive the impellers 60 and 60A. Each of the impellers 60 and 60A comprises a cylindrical drum having a vertical axis standing upwardly along the rear wall. Each of the impellers extends from a bottom plate which is below the cutting plane to a position at the top of the header. Thus each of the impellers is available to engage crop passing between the disks 50 and 56 over the full height of the available crop.

Each of the impellers 60 and 60A includes crop engaging elements on the outside surface which are parallel to the axis. Crop engaging elements 68 of the impeller 60 are formed by rods extending along the outer surface of the impeller and connected to the top and bottom plates of the impeller where the top plate is visible in FIG. 2 and illustrated at 69. The drum following the impeller 60 is smaller than that of the drum following the impeller 60A. The impeller 60A has on its outside surface as crop engaging elements flanges 70 which project radially outwardly so they have an increased crop engaging action relative to the bars 68 of the inner impeller 60. The outer impeller 60A is larger and hence is slightly forward of the inner impeller 60 thus tending to carry the crop outwardly across the front of the two impellers to the discharge opening. In the embodiment shown the axis of the impeller 60 is aligned with the axis of the impeller 60A so that the plane containing those axes lies parallel to the wall 64. However an alternative arrangement (not shown) can be provided in which the outer impeller 60A is moved forwardly and slightly inwardly so as to be positioned more closely behind the zone 57.

In a typical example, the inner impeller has a drum of 5 inch diameter with the outer rods providing an effective outermost diameter of 6 inches. In the typical example, the outer impeller has a drum diameter of 6 or 7 inches with the flanges providing an outermost diameter of the order of 10 inches.

In order to prevent crop from wedging between the inner impeller 60 and the housing 66 of the transfer roller, the front face of the inner impeller is arranged to project forwardly from the housing portion 66 so that a front face 66A of the housing is aligned with a 9:00 o'clock position on the inner impeller 60. Thus the whole of the front face projects forwardly to engage the crop and carry the crop across the front face 66A into the area on top of the transfer roller 75.

As the impellers 60 and 60A extend through the cutting plane, it is necessary that the circulars paths defined by the blades of the cutting disks 50 and 56 do not intersect with the outermost periphery of the impellers. Thus the impellers are positioned as far forwardly as possible while providing just sufficient clearance between the outer periphery of the impellers and the path of the blades to avoid impact and damage.

The positioning of the impellers behind the zone 57 allows the use of a disk at the outermost end of the discharge opening which is disk 50 which rotates outwardly rather than inwardly. This can provide a better crop transfer action in that the crop is more effectively cut and passed through and over the disks to a position behind the disks and then is converged inwardly behind the disks. Thus the cutting action is more effective than a cutting action using 3 outermost disks which all turn inwardly. The provision of the impellers behind the disks but outboard of the discharge opening maintains the effective cutting action while transferring the crop effectively into the discharge opening. The impellers operate entirely differently from impellers which co-operate with disks turning inwardly since in the present arrangement the crop material passes through the cutting action before engaging the impellers behind the disks. The impellers are located wholly behind the disks and beyond the cutting path of the disks.

Turning now to FIG. 5, there is shown an alternative arrangement which is substantially the same as that described above but in this arrangement the crop converging structures behind the disks 50 and 56 are provided in the form of frustoconical member 240 having a generally horizontal axis 241 extending forwardly from the vertical wall 224. The member is located at a height on the wall 224 above the respective cutter disks with a rear face 245 at the wall 224 and a frustoconical outer periphery 242 thereof rotating about the axis 241 and extending to a front face 243 parallel to the wall 224. In this arrangement the wall 224 is inclined rearwardly and inwardly rather than having the recess as shown in the previous embodiment.

Other converging arrangements can be used with the configuration of the disks as described above in which the disk 50 rotates outwardly and the two outermost disks 56 and 61 rotate inwardly.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes of the disks spaced along the cutter bar;

each disk having mounted thereon at a position spaced outwardly from the respective axis thereof at least one cutter blade such that rotation of the disk about the respective its axis of the disk causes a standing crop to be cut by the blade as the blade rotates with the disk around the axis of the disk;

the header frame defining a discharge opening through which the cut crop is discharged for forming a swath behind the header;

in front of the discharge opening there being located a plurality of the cutter disks;

at a first end of the cutter bar outboard of a first end of the discharge opening there being provided a first outermost cutter disk and a first next adjacent cutter disk located inboard of the first outermost disk;

the first outermost cutter disk and the first next adjacent cutter disk each being arranged to rotate in a direction so that a front of each moves inwardly toward the first end of the discharge opening;

a first impeller located on the first outermost cutter disk for rotation therewith;

a first suspended impeller located between the first outermost cutter disk and the first next adjacent cutter disk;

the first impeller and first suspended impeller arranged to rotate in a direction so that a front of each moves inwardly toward the first end of the discharge opening;

and a first crop converging structure located at least partly in an area behind the first next adjacent cutter disk and tending to move the crop inwardly toward the first end of the discharge opening;

at a second end of the cutter bar outboard of a second end of the discharge opening there being provided a second outermost cutter disk and a second next adjacent cutter disk located inboard of the second outermost disk;

the second outermost cutter disk and the second next adjacent cutter disk each being arranged to rotate in a direction so that a front of each moves inwardly toward the second end of the discharge opening;

a second impeller located on the second outermost cutter disk for rotation therewith;

a second suspended impeller located between the second outermost cutter disk and the second next adjacent cutter disk;

the second impeller and second suspended impeller arranged to rotate in a direction so that a front of each moves inwardly toward the second end of the discharge opening;

and a second crop converging structure located at least partly in an area behind the second next adjacent cutter disk and tending to move the crop inwardly toward the second end of the discharge opening;

wherein each of the impellers comprises a plurality of upstanding bars at angularly spaced positions surrounding an axis of the impeller for rotation around the axis of the impeller.

2. The header according to claim 1 wherein there is provided a first rear wall behind the first outermost cutter disk and the first next adjacent cutter disk and the first crop converging structure is mounted so that an outer surface thereof projects to a position in front of the first rear wall and wherein there is provided a second rear wall behind the second outermost cutter disk and the second next adjacent cutter disk and the second crop converging structure is mounted so that an outer surface thereof projects to a position in front of the second rear wall.

3. The header according to claim 2 wherein the discharge opening has a first side wall extending rearwardly from the first rear wall and a second side wall extending rearwardly from the second rear wall.

* * * * *